United States Patent Office 2,960,726
Patented Nov. 22, 1960

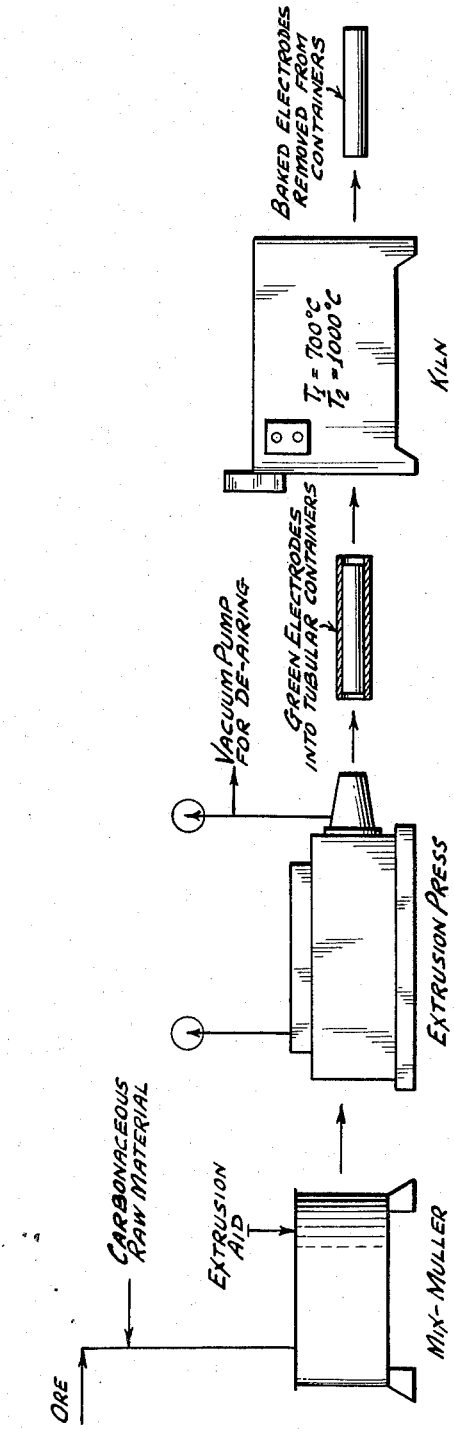

2,960,726

PROCESS FOR FABRICATING ELECTRODES

Charles Sheer, Teaneck, N.J., and Samuel Korman, Cedarhurst, N.Y., assignors to Sheer-Korman Associates, Inc., New York, N.Y., a corporation of Delaware Original application Jan. 23, 1956, Ser. No. 560,703. Divided and this application Nov. 19, 1957, Ser. No. 697,324

4 Claims. (Cl. 18—54.7)

This invention relates to the production of a compound anode for use in a high erosion arc, or as it is frequently called, a hierarc.

Such an arc is coming into extensive use in chemistry by reason of the fact that it makes possible the attainment of temperatures up to 10,000° C. near the anode face. If a chemical substance be incorporated in the hierarc anode, it will be completely dissociated into its elements in vapor form. Such temperatures make it possible to establish reaction at these high temperatures between chemicals contained in the anode or between such substances and the carbon of the electrode, or with the surrounding atmosphere.

In our former process, Patent No. 2,616,843, we disclosed certain treatment of refractory materials when incorporated into the anode of a hierarc. Subsequently, in attempting to use a hierarc for the reduction of semi-refractory ores, such as boron compounds, it was found that it could not be conducted on a satisfactory basis by the techniques then known, since the electrode could not be stabilized during the baking process. The ore oozed out of the green electrode before the baking could be completed. It was found that it was essential for the ore particles to remain in the solid state up to the temperature required for pyrolysis of the carbon ores, for all materials to be treated by this technique.

A new process was then devised for the treatment of such ores which overcame that difficulty, and application for patent for that process was filed, bearing Serial No. 560,703. A new method of anode manufacture comprised an important phase of that process.

The present application is filed as a division of that former application to cover the method of anode fabrication in itself, apart from its use in the process.

Since this process was first used in the treatment of borax, we shall herewith describe the new process as applied to borax, although the process is applicable to other compounds, where the melting point of the compound is above 600° C.

In accordance with this invention it has been found that a satisfactory electrode can be made if the baking cycle is conducted in two distinctive stages:

(1) Hold the freshly formed electrode for a period of time at a temperature which is below the melting point of the ore, but above the temperature at which pyrolyzation of the hydrocarbon content of the carbon source proceeds, for a period of time sufficient to form a strong carbon matrix. The quantity of carbon thus furnished produces an electrode of low resistance and firm matrix.

(2) Raise the temperature to the point required to complete the carbonization process.

Since for a practical process the complete carbonization requires temperatures of the order of 1000° C. it follows that this will be above the melting point of the ore. However, by allowing the carbon matrix to form while the ore is still in the solid state, which is in the first stage of the baking cycle, we discovered that the ore can be retained in the pores of this matrix during the second stage of higher temperature, even if it is in the molten state. We have found that if the ore becomes molten before a sufficiently strong matrix has formed, the orelets coalesce, breaking the general matrix structure and oozing out of the electrode. Since it is advisable to pyrolize the carbonization material as rapidly as possible, the baking temperature of the first stage should be as high as possible, consistent with maintaining the ore in the solid state, in other words, the exact temperature of stage 1 should be slightly below the melting temperature of the ore material, e.g. 700° C. for boron, which melts at 740° C.

Accordingly, in the case of borax, the electrodes encased in the mold are heated to a temperature below 740° C., for example, about 700° C., for an hour. Thereafter, the temperature is slowly raised so that in about an hour it reaches 1000° C. During this period it is desirable that the mold be rotated about its axis in a horizontal position to insure a uniform distribution of the metalloid in the matrix. It is kept at that temperature for about an hour—a total of three hours—when the electrode is complete, and of the nature described.

The borax ($Na_2B_4O_7$) is first pulverized to the order of $-60$ mesh and thoroughly dry-mixed with a powdered carbon source, such as soft coal or pitch. A practical example giving the proportions we now prefer would be 1350 gram borax and 800 gram coal, preferably having about 21% VCM. (For any other compound the weight will be varied in proportion to the molecular weight of the metal content.)

When these have been thoroughly mixed, a non-aqueous liquid vehicle is added. The vehicle we have found most effective comprises equal parts dibutyl phthalate and Flexol.

Flexol is a product of Carbide and Carbon Chemical Corporation for use as a plasticizer, and it is readily obtainable but its composition is unknown. Other non-aqueous liquid vehicles such as resinous oil may also be employed. It is important for borax that the plasticizer shall be non-aqueous since the borax is readily soluble.

To the 2150 gram of the dry-mixed borax and carbon is then added 500 cc. of the mixed vehicle, and the combined ingredients wet-mixed. The plastic mass so formed is then charged into the cylinder of an extrusion machine which is sealed and evacuated to remove entrapped air. After "de-airing" it is extruded into proper size and length for the anode to be used, and allowed to dry. After drying, the "green" electrodes are then removed and loaded into porous molds. The latter may be made of graphite, silica carbide, or similar suitable material, which allows for the escape of volatiles from the carbonization of the coal, while still maintaining the desired shape of the electrode throughout the baking process. If it is desired to use a mold wash, finely divided carbon may be used.

After baking, the electrodes are removed from the molds and cleaned. We have found it advantageous, in many cases, to apply a thin surface layer of carbonaceous material, to provide a refractory conductive relatively non-porous skin to the electrodes. The latter prevents the "sweating out" of the molten boron compound near the surface just before it enters the arc, and protects the contact brushes during the arc operation. The carbonaceous coating material may also consist of pitch, preferably of a lower volatile content than that used in the body of the electrode, say, about 20%. Certain resins such as the liquid phenolic resins may also be used for this purpose. The coating is applied by either dipping, or by painting with a brush. The skin is carbonized by a second bake, similar to that described above, except that it may be performed more rapidly, since only a small amount of material is involved.

As an alternative, the protective skin may be applied to the green electrodes and baked together with the main electrode, thus saving a step in the fabrication procedure. This is less desirable, practically, since it requires a much longer baking time and more critical control of temperature, owing to the necessity of volatiles from the interior passing through the skin during carbonization. Unless done very slowly, this will impart too great a porosity to the skin, defeating its purpose.

Still a third alternative is the deposition of a layer of graphite on the finished electrode by electrophoresis from a colloidal non-aqueous graphite suspension. Such surface layers up to 10 mils in thickness have been deposited and found to work quite well in protecting the brushes during arc operation.

The volatile content of the coal or pitch used in the original mixture is a factor of importance, since this, along with the baking schedule, determines the degree of porosity in the final electrode. The optimum degree of porosity depends in turn on the size of the electrode (diameter) and the arc current to be used in the erosion process. The porosity should be at least great enough to allow easy expansion of the boron compound as it melts below the arc crater, in order to eliminate the building up of internal pressures and consequent spalling of the electrode during operation.

Additional porosity is desirable since this inhibits heat conduction from the crater back along the electrode, thus minimizing the extent of the temperature zone where undesirable melting or carbide formation can take place. Simultaneously, the linear erosion rate of the electrode increases with increased porosity, thereby reducing the residence time of the material in this zone, further inhibiting carbide formation or premature melting. The porosity should, therefore, be as high as possible, consistent with reasonable physical strength and sufficient electrical conductivity, to carry the current required for a high erosion arc discharge. Hence, the volatile content cannot be specified until the diameter of the electrode and the current carrying requirements are specified. When these are given, however, it is a simple matter to determine optimum volatile content by trial and error. We have found that, in general, this will lie in the range 15%–40% VCM.

In addition to pitch, we have found that certain grades of soft coal may also be used. These would have to contain the proper percentage of hydrocarbon volatiles, and as little nitrogen and oxygen as possible. We have found that the latter interfere with carbonization into a continuous carbon matrix. The use of pitch is, however, preferable, because of the superior properties as regards plasticity, because its volatile content can more easily be adjusted by known methods, and finally, because it contains little or no ash, which might be carried over to contaminate the end product of the arc reduction.

What is claimed:

1. A process of forming an electrode from boron ores having a melting point above 600° C., for use in a high erosion arc, which comprises pulverizing the ore to about −60 mesh and mixing the powdered ore with a quantity of soft coal or pitch sufficient to produce in the electrode after baking a sufficient amount of carbon to produce an anode of low resistance and a firm matrix, and to reduce any oxides that may be present in the ore, adding to the mass a suitable plasticizer and extruding it to anode form, baking the said anode at a temperature a few degrees less than the melting point of the ore, until the coal is pyrolyzed, and raising the temperature to substantially 1000° C. until the electrode is completely baked.

2. A process according to claim 1 in which the ore is borax.

3. A process according to claim 1 in which the electrode is held in a horizontal position in a mold, and the mold is rotated about its axis during the early stages of its baking.

4. A process according to claim 3 in which the ore is borax.

References Cited in the file of this patent

UNITED STATES PATENTS

| | | |
|---|---|---|
| 166,433 | Weston | Aug. 3, 1875 |
| 1,138,674 | Little et al. | May 11, 1915 |
| 2,270,199 | Thrune | Jan. 13, 1942 |
| 2,616,842 | Sheer et al. | Nov. 4, 1952 |
| 2,652,354 | Dryden et al. | Sept. 15, 1953 |